July 27, 1954    W. O. KIRKPATRICK    2,684,736
HANDLE-ATTACHING DEVICE
Filed Dec. 12, 1952

INVENTOR.
WILLIAM O. KIRKPATRICK
BY
John W. Michael
ATTORNEY

Patented July 27, 1954

2,684,736

UNITED STATES PATENT OFFICE 2,684,736

HANDLE-ATTACHING DEVICE

William O. Kirkpatrick, Milwaukee, Wis., assignor to E. R. Wagner Manufacturing Company, Milwaukee, Wis., a corporation of Wisconsin Application December 12, 1952, Serial No. 325,608

1 Claim. (Cl. 190—58)

This invention relates to improvements in attaching devices for handles used on suitcases, traveling bags, or other like receptacles.

Handle holders or handle-attaching devices of this type must be light in weight, easy to attach, strong and durable, and have an attractive appearance. A handle-attaching device of this character is disclosed and claimed in United States Patent No. 2,332,765 issued October 26, 1943, to Berthold R. Thiele and assigned to the assignee of this application. The handle-attaching device of such patent, however, requires first the accurate spacing and assembly of two devices and the additional operation of inserting pivot pins after the attaching devices have been secured to the case.

It is an object of this invention, therefore, to provide a handle holder which has the foregoing characteristics and which may also be assembled without accurate spacing of two holders and inserting pivot pins after the attaching of the holders.

This object is accomplished by providing the handle holder with a laterally extending pivot unsupported at its outer end. The holder has penetrating prongs of customary design by which it is secured to the wall of the case. To assemble the handle to the case, the pivots of a pair of handle holders are inserted in the holes in the handle and held in proper position while the prongs are pressed through the wall of the case and clinched over.

The novel features, which are considered characteristic of the invention, are set forth with particularity in the appended claim. The invention itself, however, both as to its organization and its method of operation, together with additional objects and advantages thereof, will best be understood from the following description of a specific embodiment when read in connection with the accompanying drawing, in which:

Figure 1:
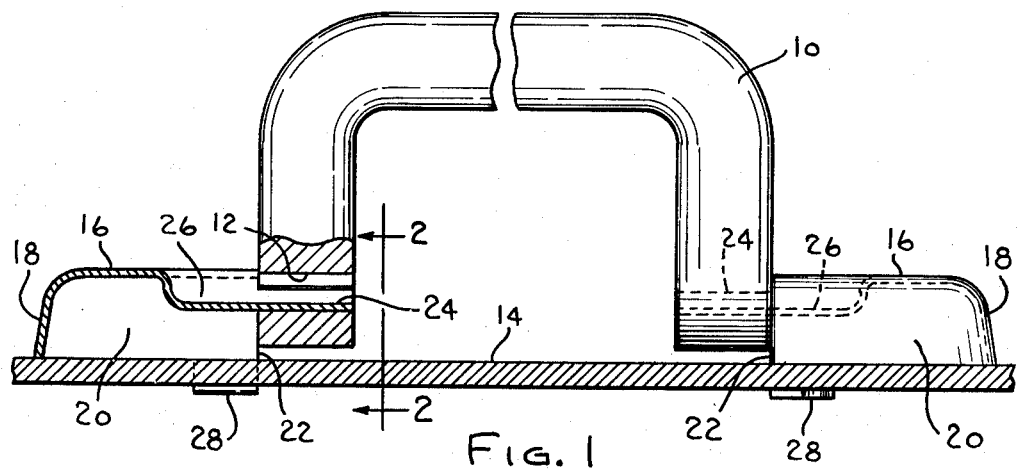
Fig. 1 is a view in side elevation with part broken away and shown in central vertical cross-section of a handle assembly utilizing handle holders embodying the present invention.
Figure 3:
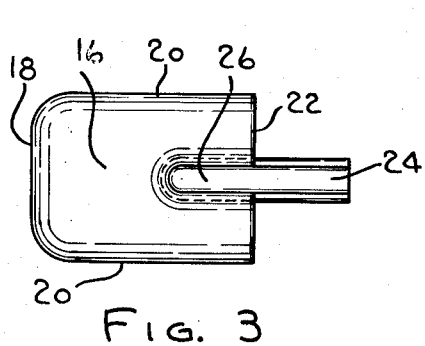
Fig. 3 is a top plan view of a handle holder embodying this invention with the handle being omitted and the prongs unclinched.
Figure 2:
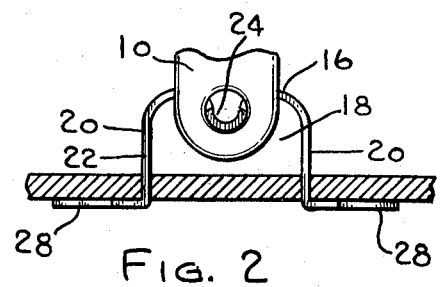
Fig. 2 is a fragmentary view in end elevation of the handle and a handle holder taken from the line 2—2 of Fig. 1.
Figure 4:
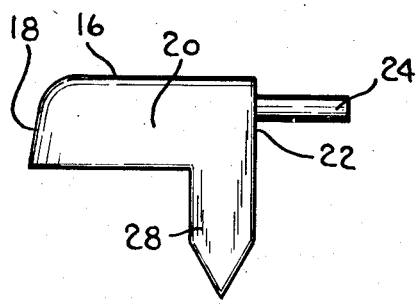
Fig. 4 is a view in side elevation of the handle holder of Fig. 3.
Figure 5:
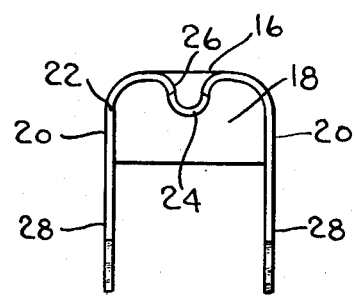
Fig. 5 is a view in end elevation of the handle holder of Fig. 3.

Referring to the drawing, there is shown a handle and case assembly comprising a handle 10 of customary design having in its legs openings 12 and two handle holders placed on the outside of the legs of such handle. Such holders have pivots inserted in the openings 12 and are attached to the wall 14 of a suitcase or other receptacle. The handle holders are of identical construction and a description of only one will be given. Each handle holder has a drawn sheet metal shell or stamping having a hollow body with a top 16 and end wall 18 and side walls 20. The other end of the body is open and has an edge 22. A pivot 24 extends laterally from the edge 22 and is integral with the top 16. As is more clearly shown in Fig. 2, such pivot is channel-shaped or U-shaped in cross-section. This provides a lower rounded bearing surface and adds sufficient rigidity and strength to prevent the pivot from bending with respect to the top 16. The top 16 is depressed during the formation of the pivot 24 so that the channel shape of such pivot extends into such top as indicated at 26, thereby eliminating unusual stresses or strains in the metal at the juncture of the pivot 24 with the edge 22.

Integral penetrating prongs 28 depend from the sides 20 adjacent the edge 22. Such prongs are of the same construction as shown in said patent. They are driven through the wall 14 to secure the handle holder and clinched over as shown.

There are at least two ways of assembling the handle 10 to the wall 14. In the first method, one of the handle holders is secured to such wall by forcing the prongs 28 through the material thereof and clinching them. Next the opening 12 in one leg is slid over the pivot 24 of such holder. There is sufficient play between the opening 12 and the pivot 24 to permit the handle to be swung away from the wall 14 far enough to permit the pivot 24 of the other holder to be inserted in the opening 12 of the other leg. While keeping this last holder in place its prongs 28 are forced through the wall 14 and clinched. In a second method, both of the two holders are first assembled with their pivots 24 in the openings 12. Then, while being held so assembled, prongs 28 of both holders are simultaneously driven through the wall 14 and clinched. In both methods accurate spacing of the handle holders is eliminated. The handle becomes the means for determining proper spacing. Only the driving and clinching of the prongs is required. There is no difficult step of separately handling disassociated pivots. The number of loose parts is lessened.

Although only one embodiment of the invention is shown and described herein, it will be understood that this application is intended to cover such changes or modifications as come within the spirit of the invention or scope of the following claim.

I claim:

A handle holder comprising a sheet metal body having a top, an end wall and side walls depending from said top, said top having an edge opposite said end wall, a handle-holding pivot integral with said top and extending outwardly from said edge, said pivot being substantially U-shaped in cross-section to form a lower bearing surface, said top being depressed to form a continuation of the substantially U-shaped cross-sectional shape of said pivot, and means for securing said holder to a receptacle.

References Cited in the file of this patent

UNITED STATES PATENTS

| Number | Name | Date |
|---|---|---|
| 2,332,765 | Thiele | Oct. 26, 1943 |
| 2,531,302 | Schwennicke | Nov. 21, 1950 |

FOREIGN PATENTS

| Number | Country | Date |
|---|---|---|
| 202,911 | Germany | Oct. 8, 1908 |